United States Patent
Yamamura et al.

(10) Patent No.: US 8,583,872 B2
(45) Date of Patent: Nov. 12, 2013

(54) CACHE MEMORY HAVING SECTOR FUNCTION

(75) Inventors: Shuji Yamamura, Kawasaki (JP); Mikio Hondou, Kawasaki (JP); Iwao Yamazaki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1043 days.

(21) Appl. No.: 12/193,888

(22) Filed: Aug. 19, 2008

(65) Prior Publication Data

US 2009/0172289 A1    Jul. 2, 2009

(30) Foreign Application Priority Data

Dec. 28, 2007    (JP) ................. 2007-341423

(51) Int. Cl.
- G06F 12/00    (2006.01)
- G06F 13/00    (2006.01)
- G06F 13/28    (2006.01)

(52) U.S. Cl.
USPC ........... 711/128; 711/133; 711/134; 711/135; 711/136; 711/159

(58) Field of Classification Search
USPC ................................ 711/128, 133–136, 159
See application file for complete search history.

(56) References Cited

U.S. PATENT DOCUMENTS

| | | | |
|---|---|---|---|
| 6,434,668 B1 | 8/2002 | Arimilli et al. | |
| 6,681,295 B1 * | 1/2004 | Root et al. | 711/128 |
| 7,574,572 B2 | 8/2009 | Yoshioka | |
| 7,904,675 B2 | 3/2011 | Yoshioka | |
| 8,078,801 B2 | 12/2011 | Buxton et al. | |
| 2004/0078532 A1 | 4/2004 | Tremaine | |
| 2005/0268041 A1 | 12/2005 | Yoshioka | |
| 2006/0004963 A1* | 1/2006 | Mattina et al. | 711/130 |
| 2006/0179227 A1* | 8/2006 | Hrusecky et al. | 711/128 |

FOREIGN PATENT DOCUMENTS

| | | |
|---|---|---|
| EP | 1 612 683 A2 | 1/2006 |
| JP | 4-69751 A | 3/1992 |
| JP | 04-175946 | 6/1992 |
| JP | 10-187533 | 7/1998 |
| JP | 11-338772 A | 12/1999 |
| JP | 2003-296191 | 10/2003 |
| JP | 2004-110240 A | 4/2004 |
| JP | 2004-164607 A | 6/2004 |
| JP | 2005-346168 A | 12/2005 |

OTHER PUBLICATIONS

Chinese Office Action issued Oct. 29, 2010 in corresponding Chinese Patent Application 200810213566.7.

(Continued)

*Primary Examiner* — Yaima Rigol
(74) *Attorney, Agent, or Firm* — Fujitsu Patent Center

(57) ABSTRACT

A cache memory having a sector function, operating in accordance with a set associative system, and performing a cache operation to replace data in a cache block in the cache way corresponding to a replacement cache way determined upon an occurrence of a cache miss comprises: storing sector ID information in association with each of the cache ways in the cache block specified by a memory access request; determining, upon the occurrence of the cache miss, replacement way candidates, in accordance with sector ID information attached to the memory access request and the stored sector ID information; selecting and outputting a replacement way from the replacement way candidates; and updating the stored sector ID information in association with each of the cache ways in the cache block specified by the memory access request, to the sector ID information attached to the memory access request.

5 Claims, 15 Drawing Sheets

(56) References Cited

OTHER PUBLICATIONS

Deville Y; "A Process-Dependent Partitioning Strategy for Cache Memories" Computer Architecture News, vol. 21, No. 1, Mar. 1993 pp. 26-33.

European Search Report issued Mar. 25, 2009 in corresponding European Patent Application 08162538.6.
Japanese Office Action mailed Aug. 14, 2012 for corresponding Japanese Application No. 2007-341423, with Partial English-language Translation.

* cited by examiner

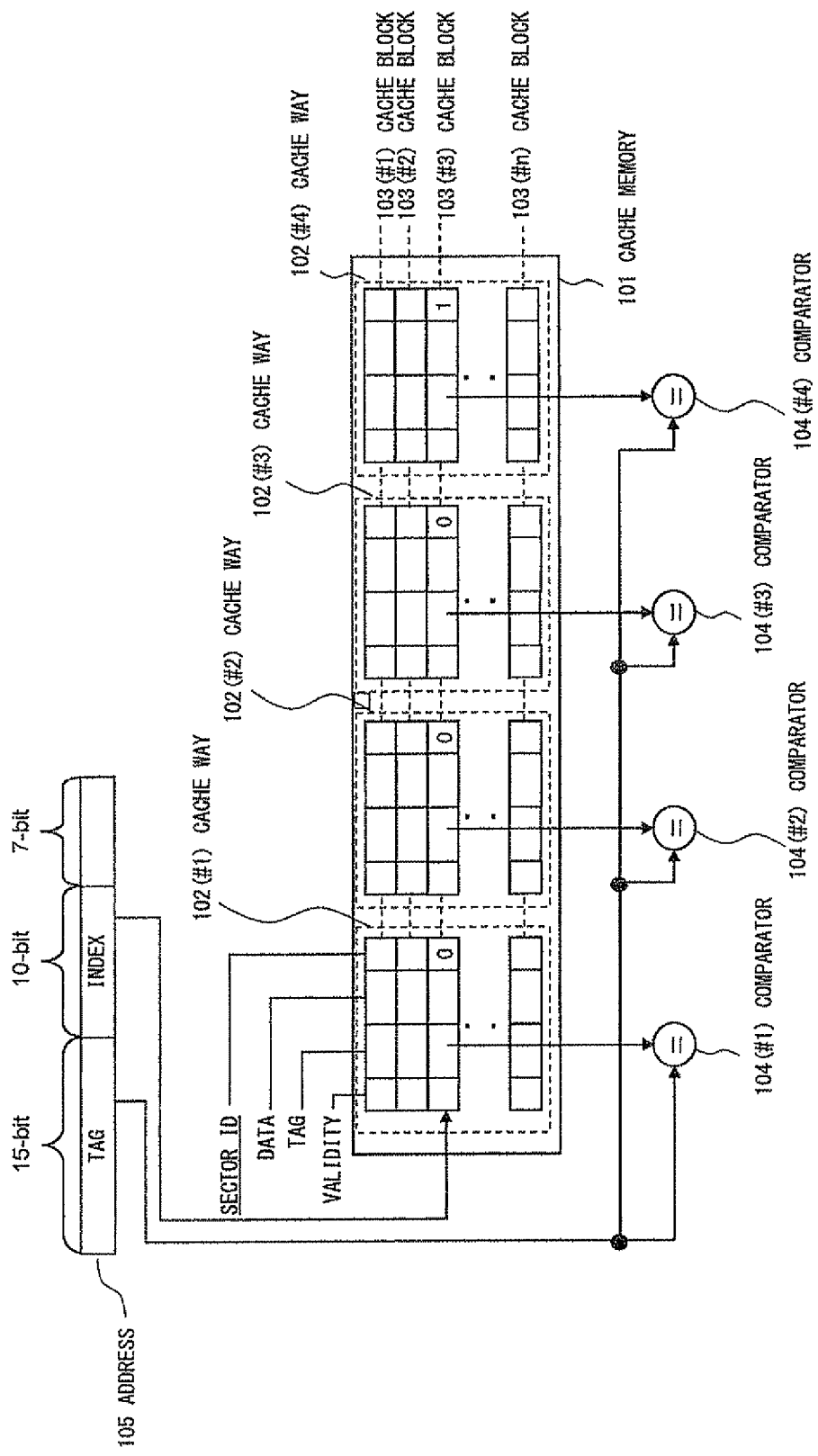
F I G. 3

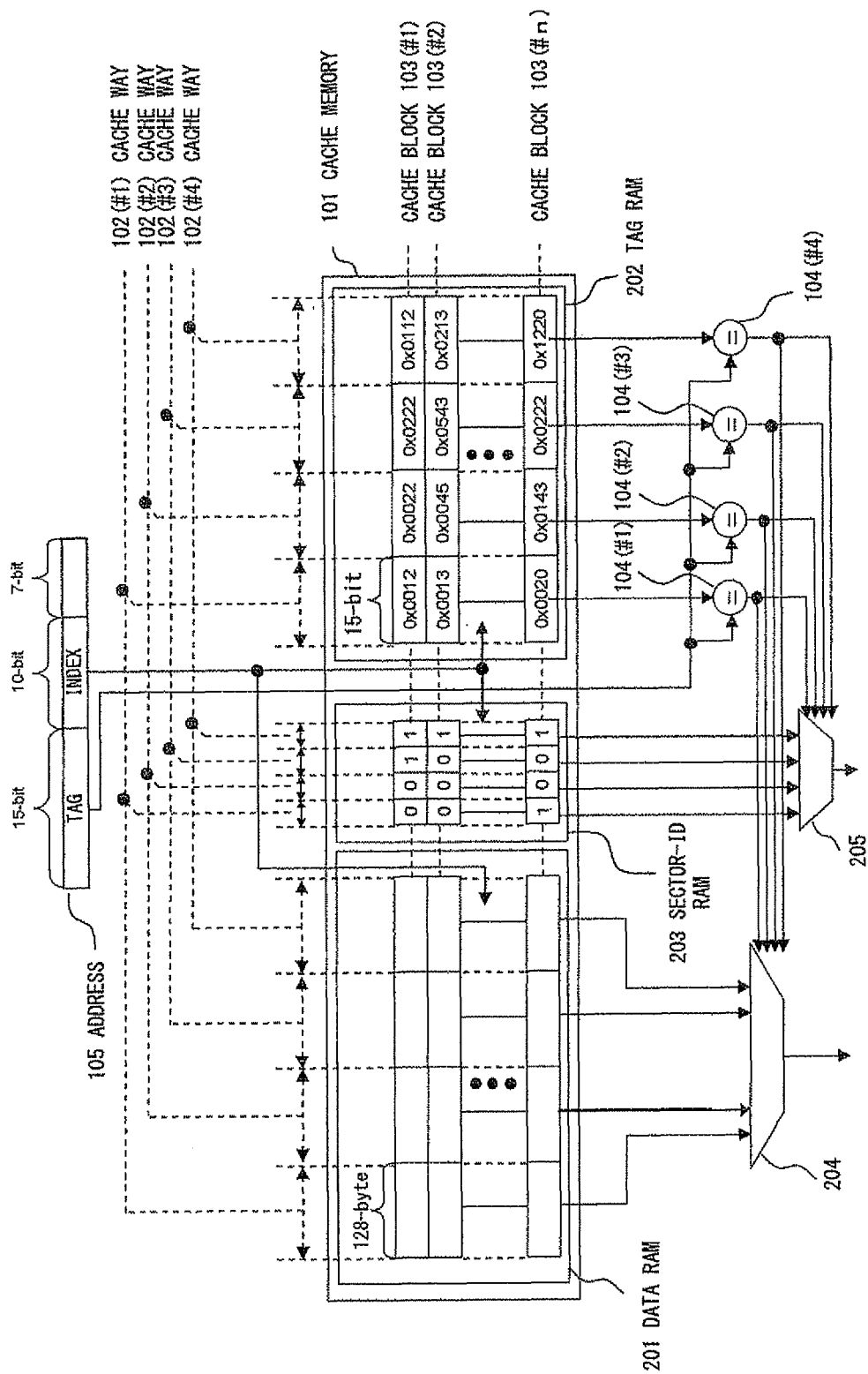
F I G. 4

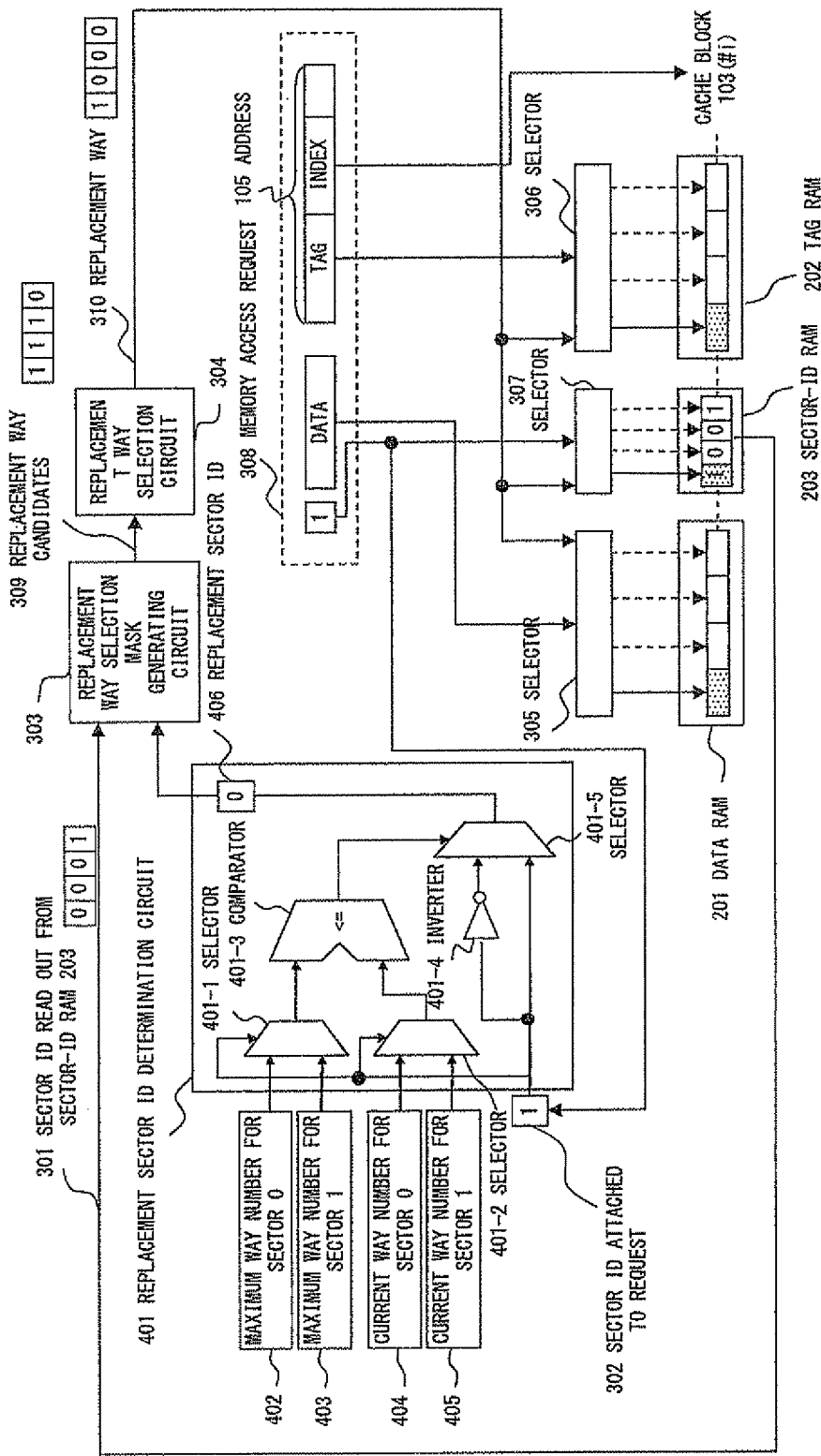
F I G. 6

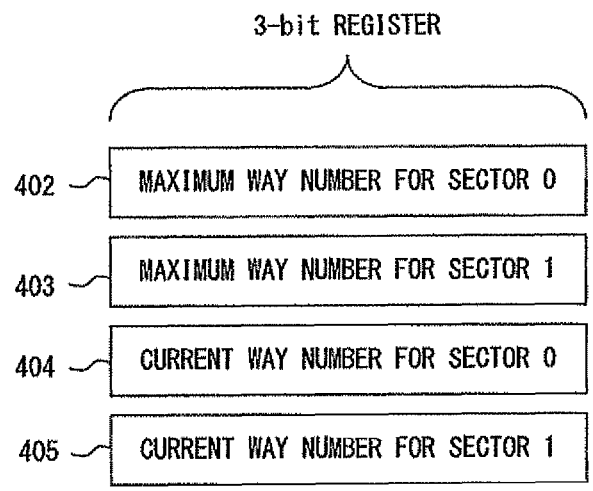
F I G. 7

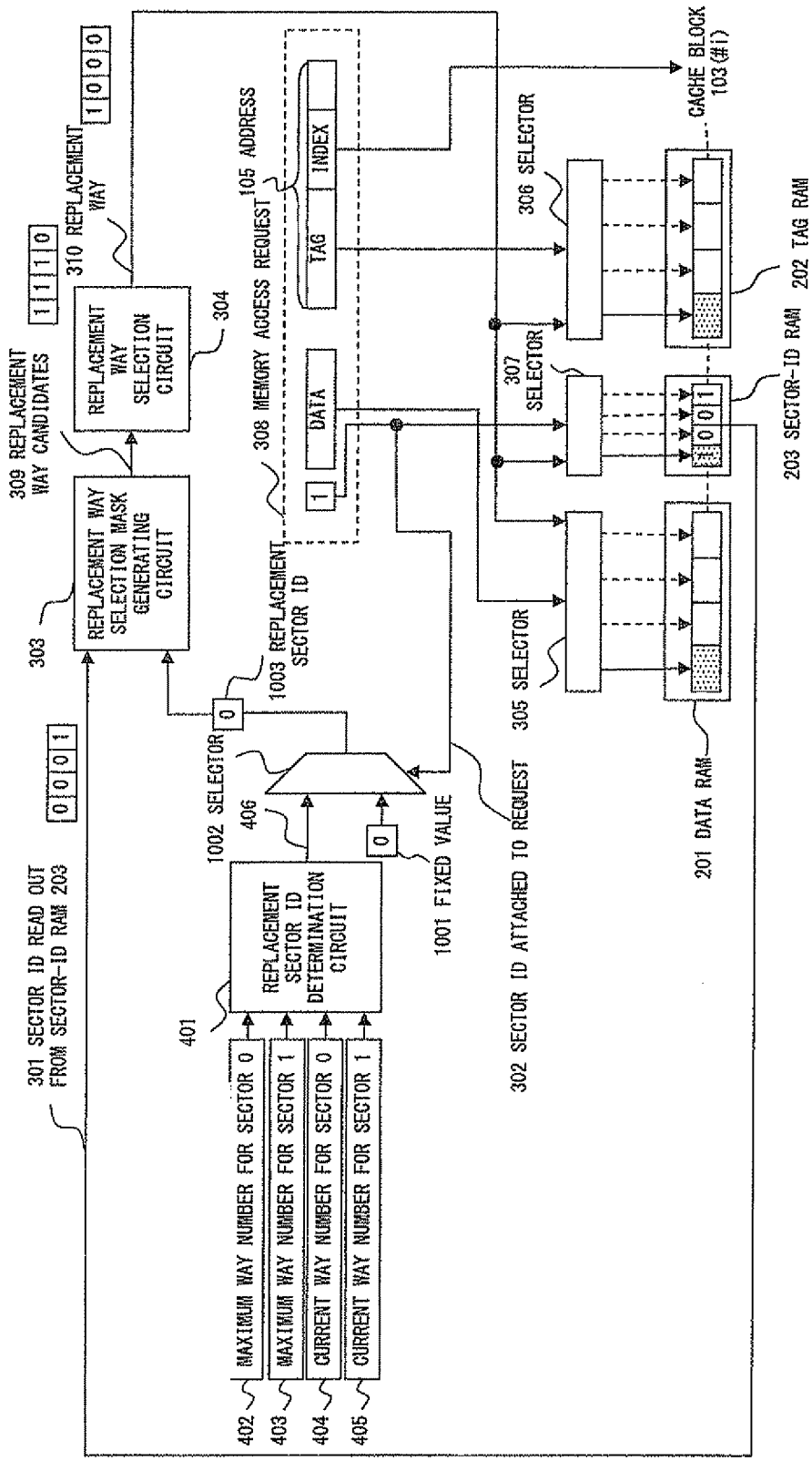
F I G. 1 2

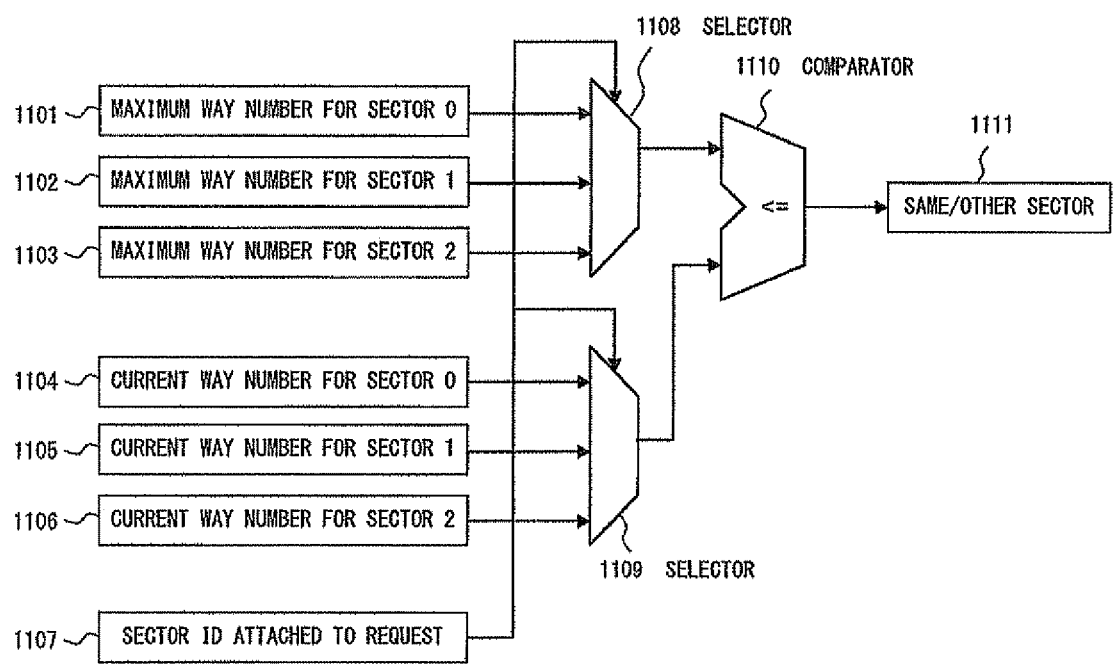
F I G. 1 3

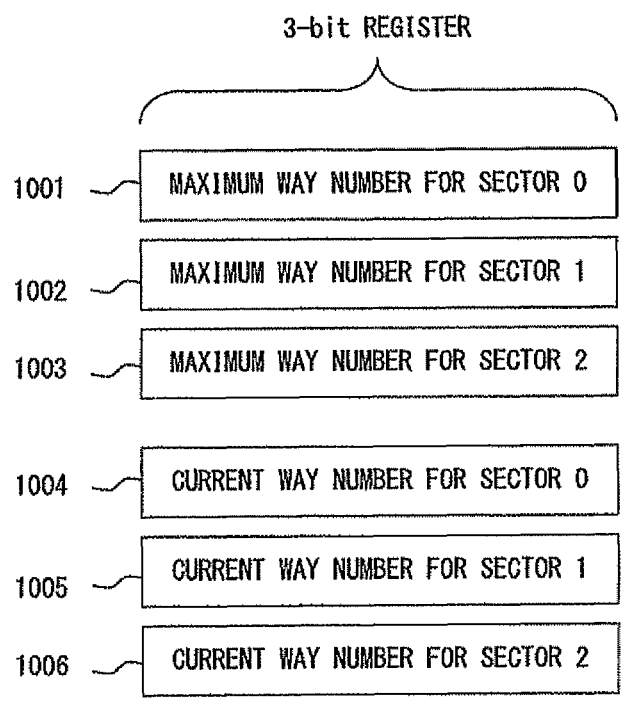
F I G. 1 4

CACHE MEMORY HAVING SECTOR FUNCTION

BACKGROUND OF THE INVENTION

1. Field of the Invention

The technique described herein relates to a cache technique for the purpose of a high-speed execution of a program in the field of the high performance processor and high performance computing.

2. Description of the Related Art

Recently, improvements in operating frequency have made the delay time for a memory access relatively longer, which has come to affect the performance of an overall system. In order to cover up the memory access delay time, processors are often provided with a high-speed memory with a small capacity called a cache memory.

FIG. 1 shows an operation outline of a set associative cache memory which is currently most popular. A cache memory 1401 comprises a plurality of sets. Each of the set is controlled by dividing it into a plurality of cache ways 1402 (hereinafter, the cache way may simply be called a "way"), for example, cache ways 1402(#1) through 1402(#4). Thus, the example in FIG. 1 illustrates a 4-way set associative cache memory.

Each of the cache ways 1402 comprises a plurality of cache blocks 1403 (hereinafter, the cache block may simply be called a "block"), for example cache blocks 1403(#1) through 1403(#n), the value of n being, for example, 1024.

Each of the cache blocks 1403 comprises a validity flag that shows validity/invalidity, a tag and data. The data size is, for example, 1 bit for the validity flag, 15 bits for the tag, and 128 bytes for the data.

The size of the cache memory 1401 is, for example, 512 kilobytes, calculated, for example, as "the size of a cache block×the number of the cache blocks×the number of the cache ways=128 bytes×1024 blocks×4 ways".

Meanwhile, an address 1405 comprises 32 bits specified by the program for the memory access. In the 32 bits of the address 1405, the top 15 bits are used as a tag, the next 10 bits are used as an index, and the last 7 bits are used as an offset within a cache block.

According to the above configuration, when a data read out for the address 1405 is specified, one of the block numbers #1 through #n is specified by the 10-bit index in the address 1405. Now, the number is assumed as #i.

As a result, the cache block 1403 (#i) corresponding to the specified block number #i is read out from each of the cache ways 1402 (#1) through (#4). The read-out cache blocks 1403 (#i) are then input to comparators 1404 (#1) through (#4), respectively.

The comparators 1404 (#1) through (#4) detect match/mismatch between the tag value in each of the read-out cache blocks 1403 (#i) and the tag value in the specified address 1405. The cache hit occurs in the cache block 1403 (#i) that is read out for the one of the comparator (#1) through (#4) in which the match is detected. As a result, the data in the cache block 1403 (#i) is readout. The above configuration thus enables a data read out at a higher speed than a read out from the main memory.

When no match is detected in all of the comparators 1404, or when the validity flag indicates invalidity even if a match is detected, the cache hit does not occur. In this case, data is read out from the address 1405 in the main memory.

Meanwhile, when a data write in for the address 1405 is specified, #i as one of the block numbers #1 through #n is specified by the 10-bit index in the address 1405, in the same manner as for the read out.

Next, a replacement way selection circuit 1501 as shown in FIG. 2 selects, from the four cache blocks 1403 (#i) corresponding to the block number #i specified respectively in the cache ways 1402 (#1) through (#4), a block which is not yet used (in which the tag is not specified), or a block with its validity flag indicating invalidity, or when all the blocks are currently used, a block in a way determined in accordance with a predetermined algorithm. Then the replacement way selection circuit 1501 outputs a 4-bit selection signal as shown in FIG. 2. In accordance with the selection signal output from the replacement way selection circuit 1501 as described above, the data is written into the cache block 1403 in the selected one of the four ways (#1) through (#4) having the specified block number #i.

When all of the blocks are currently used, the selection from the four cache ways 1402 (#1) through (#4) is made in accordance with, for example, the LRU (Least Recently Used) algorithm. According to the algorithm, the cache block data in the cache way that was least recently used is selected and replaced (removed).

As is apparent from the above operation description, when the object of the write in is large-size data, a plurality of pieces of data may have the same index value in the address 1405, causing cache conflicts between the pieces of data. However, in a set associative cache memory, even if the same cache block 1403 is specified from the cache blocks 1403 (#1) through (#n) by the index, the cache block selection can be made from a plurality of cache ways. Therefore, for example, the 4-way cache memory 1401 shown in FIG. 1 can handle maximum of four pieces of data having the same index.

In the common cache memory having the configuration as described above, a programmer cannot distinctly specify the data arrangement, such as to keep predetermined pieces of data in the cache memory so that a high-speed access can be made to the data. For this reason, there has been a problem that processing performance deteriorates due to unintended data removal (replacement).

Methods using a local memory, scratch pad or cache line (way) lock have been proposed to solve the above problem.

Japanese Patent Application Publication No. 10-187533 discloses a conventional art in which a cache memory that can be divided into (1) a normal cache memory area and (2) a scratch pad (or a local memory) area for use.

Japanese Patent Application Publication No. 4-175946 also discloses the use of a cache memory while dividing it into a normal cache memory area and a local memory area. According to the conventional art, an address space of the main memory is given respectively to the cache memory and to the local memory area, to maintain data consistency by distinguishing which area is accessed at the time of a memory access.

Other methods have been proposed for enabling object data to continuously exist in a cache memory by locking a certain cache memory or a cache way in the cache memory, instead of dividing the cache memory as described above.

Meanwhile, the weakest way method has been proposed, as a conventional art mainly for avoiding unintended data removal with an access to stream data. According to the method, when transferring a piece of data to a cache memory in accordance with a memory access instruction, the piece of data can be specified as the data to be removed first, among pieces of data having the same index, which makes it possible to remove data that is used only once, such as stream data, prior to the other data.

However, the conventional art described in Japanese Patent Application Publication No. 10-187533 requires special instructions for the scratch pad area (loading instruction to read in data from the main memory and write-back instruction to write the data back into the main memory). It also has problems such as a need for control to maintain data consistency between the cache area, scratch pad area and the main memory.

The conventional art described in Japanese Patent Application Publication No. 4-175946 a problem such as a need for an area judgment circuit. Furthermore, it requires a control by an operating system to manage the memory space.

In addition, both Japanese Patent Application Publication No. 10-187533 and Japanese Patent Application Publication No. 4-175946 have a problem that the operations such as the change of the area size during the program execution involve a large performance overhead.

Meanwhile, the conventional art of locking a cache line or cache way can easily cause problems such as that, when the programmer forgets to perform the unlocking operation or when the programmer locks all cache areas by mistake, the cache system does not operate properly, leading a system shutdown. It also has problem that a dedicated hardware mechanism needs to be provided, the additional hardware requiring a high cost.

Furthermore, the conventional art adopting the weakest way method has a problem that it cannot be implemented with the conventional art related to the local memory function.

Japanese Patent Application Publication No. 2003-296191 has also been disclosed as a conventional art.

SUMMARY OF THE INVENTION

A cache memory having a sector function, operating in accordance with a set associative system with each set comprising two or more cache ways, and performing a cache operation to replace data in a cache block in the cache way corresponding to a replacement cache way determined upon an occurrence of a cache miss, comprises:

a sector ID information storing unit for storing sector ID information in association with each of the cache ways in the cache block specified by a memory access request, the sector ID information being defined for controlling a replacement status of each of the cache ways and being allowed to comprise two or more logical values;

replacement way candidate determination unit for determining, upon the occurrence of the cache miss, replacement way candidates being candidates for the replacement way, in accordance with sector ID information attached to the memory access request and sector ID information stored in the sector ID information storing unit in association with each of the cache ways in the cache block specified by a memory access request;

a replacement way selection unit for selecting and outputting a replacement way from the replacement way candidates; and a sector ID information update unit for updating the sector ID information stored in the sector ID information storing unit in association with each of the cache ways in the cache block specified by a memory access request, to the sector ID information attached to the memory access request.

BRIEF DESCRIPTION OF THE DRAWINGS

FIG. 3 is a diagram showing a functional configuration of a cache memory, for all of first through sixth embodiments.

FIG. 4 is a diagram showing a hardware configuration of a cache memory, for all of the first through sixth embodiments.

FIG. 6 is a block diagram related to an improved mode of a replacement way control circuit according to the second embodiment.

FIG. 7 is a block diagram of registers according to the second embodiment.

FIG. 12 is a block diagram of a further improved mode of the replacement way control circuit according to the fifth embodiment.

FIG. 13 is a block diagram (part 1) of the sixth embodiment.

FIG. 14 is a block diagram of registers according to the sixth embodiment.

DESCRIPTION OF THE PREFERRED EMBODIMENTS

The embodiments realize a cache memory with a small performance overhead, being free of system shutdown due to a locked status, and compatible with both of the local-memory related function and the weakest way method, requiring only a small amount of cost for hardware and software modification.

Each embodiment is assumed to be a cache memory operating in accordance with a set associative system with each set comprising two or more cache ways, and performing a cache operation to replace data in a cache block in the cache way corresponding to a replacement cache way determined upon an occurrence of a cache miss.

The first embodiment has a configuration described below.

A sector ID information storing unit (for example, a sector-ID RAM 203 in FIG. 4) stores sector ID information in association with each of the cache ways in a cache block specified by a memory access request. The sector ID information is defined in order to control the replacement status of each of the cache ways, and may comprise, for example, two logical values or three or more logical values.

Figure 5:
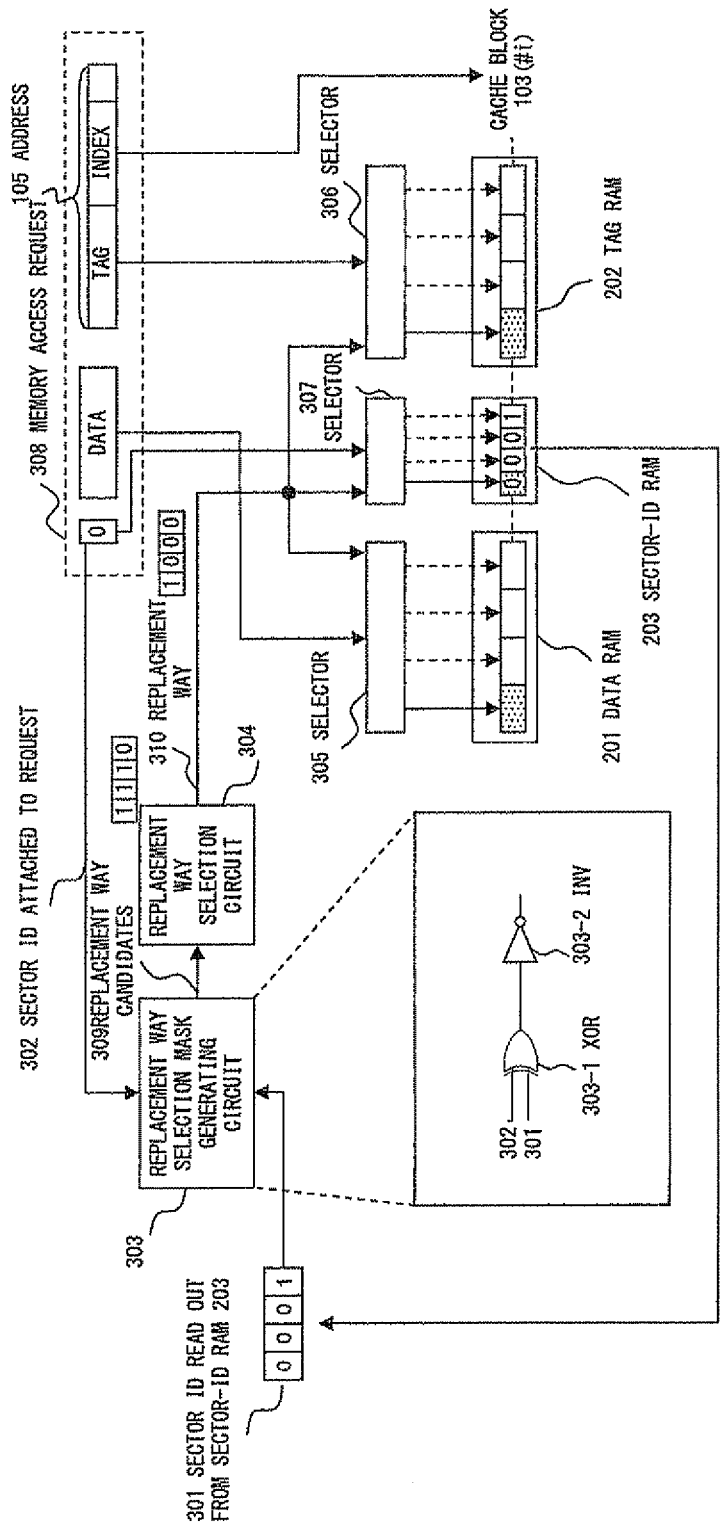
FIG. 5 is a block diagram of a replacement way control circuit according to the first embodiment.

A replacement way candidate determination unit (for example, a replacement way selection mask generating circuit 303 in FIG. 5) determines, upon the occurrence of a cache miss, replacement way candidates that are potential objects of replacement, on the basis of sector ID information attached to a memory access request and sector ID information stored in the sector ID storing unit in association with each of the cache ways in a cache block specified by the memory access request.

A replacement way selection unit (for example, a replacement way selection unit 304) selects and outputs a replacement way from replacement way candidates.

A sector ID information update unit (for example, a selector 307 in FIG. 5) updates sector ID information that is stored in the sector ID storing unit in association with the cache way corresponding to the replacement way in the cache block specified by the memory access, to sector ID information attached to the memory access request.

In addition to the above-described configuration of the first embodiment, the second embodiment further has the configuration described below.

A maximum way number specification unit (for example, registers 402 through 405 in FIG. 6) specifies, as a maximum way number, the maximum number of cache ways that can be assigned to each logical value of sector ID information.

A comparison unit (for example, a replacement sector ID determination circuit 401 in FIG. 6) compares the number of cache ways having the same sector ID information as the sector ID information attached to the memory access request, in sector ID information stored in the sector ID storing unit association with each of the cache ways in a cache block specified by the memory access request, and the maximum way number specified by the maximum way number specification unit for the same sector ID information as the sector ID information attached to the memory access.

Then, upon the occurrence of a cache miss, the replacement way candidate determination unit (for example, a replacement way selection mask generating circuit 303 in FIG. 6) determines, as the replacement way candidates, with reference to the sector ID information stored in the sector ID information storing unit in association with each of the cache ways in the cache block specified by the memory access request, either of a group of the cache ways storing the sector ID information other than the sector ID information attached to the memory access request, or a group of the cache ways storing the same sector ID information as the sector ID information attached to the memory access request, in accordance with the result of the comparison performed by the comparison unit.

In addition to the above-described configuration of the second embodiment, the third embodiment further has the configuration described below.

By the maximum way number specification unit (for example, registers 402 through 405 in FIG. 6), the maximum way number for each of the logical values of the sector ID information can be set in a manner in which a total number of the respective maximum way numbers for each of the logical values of the sector ID information exceeds a number of the cache ways provided in the cache memory.

The fourth embodiment further has the configuration described below, in addition to the above-described configuration of the first embodiment.

The replacement way candidate determination unit (for example, a replacement way selection mask generating circuit 303 in FIG. 12) determines, upon the occurrence of the cache miss, as the replacement way candidates for a predetermined value (for example, a fixed value 1001 in FIG. 12) specified by a user as sector ID information, with reference to the sector ID information stored in the sector ID information storing unit in association with each of the cache ways in the cache block specified by the memory access request, a group of the cache ways storing the same sector ID information as the sector ID information attached to the memory access request, without judging the result of the comparison performed by the comparison unit.

A fifth embodiment further has the configuration described below, in addition to one of the above-described configurations of the first through fourth embodiments.

Figure 9:
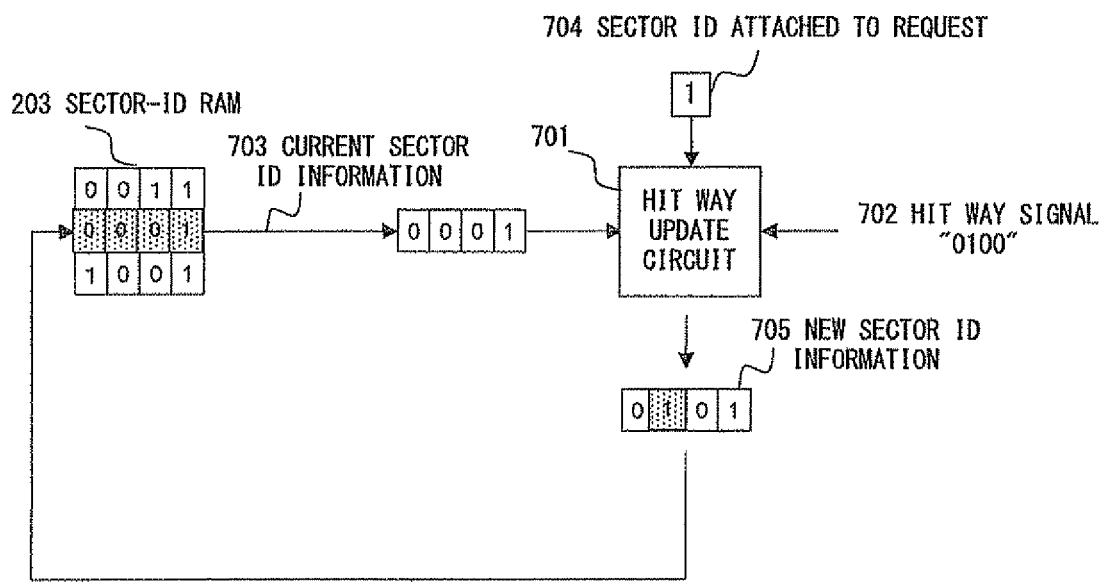
FIG. 9 is a block diagram related to a hit way control circuit according to the third embodiment.

The sector ID information update unit updates, upon an occurrence of a cache hit for a memory access request, the sector ID information stored in the sector ID information storing unit in association with each of the cache ways in the cache block specified by the memory access request, to the sector ID information attached to the memory access request (for example, the configuration of 701 in FIG. 9).

Hereinafter, best modes for carrying out the embodiments are described in detail, referring to the drawings.

FIG. 3 is a diagram showing a functional configuration of a cache memory, for all of the first through sixth embodiments. The configuration shown in FIG. 3 is not a limitation but an example.

Figure 1:
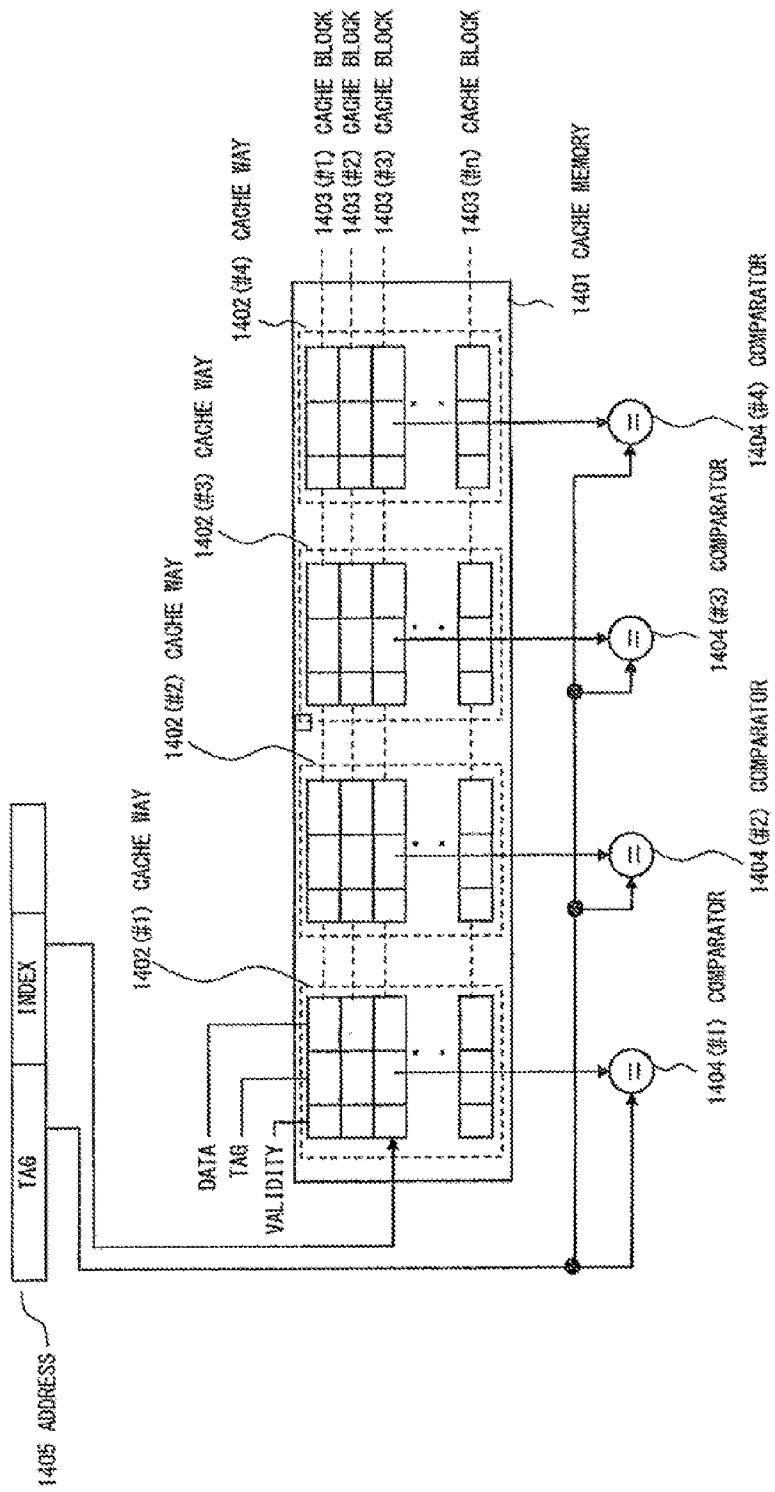
FIG. 1 is a diagram showing an operation outline of a set associative cache memory.
Figure 2:
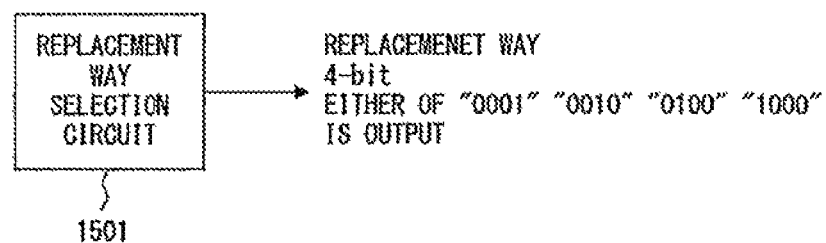
FIG. 2 is a diagram illustrating a replacement way selection circuit.

The cache memory in the embodiments is realized as a set associative cache memory, as well as the one shown in FIG. 1.

A cache memory 101 is controlled by dividing it into a plurality of cache ways 102 (#1) through (#4), each of the cache ways 102 comprising a plurality of cache blocks 103 (#1) through (#n). The value of n is, for example, 1024.

In the embodiment shown in FIG. 3, each of the cache blocks 103 has a distinctive feature that it comprises a sector ID, in addition to a common validity flag (1 bit, not provided for a cache block in some cases), tag (15 bits) and data (128 bytes). The sector ID may comprise 1 bit or 2 bits. The value of a 1-bit sector ID may be either 0 or 1. The values of a 2-bit sector ID may be either of three choices 0 through 2, or from four choices 0 through 3.

The size of the cache memory 101 is, for example, 512 kilobytes, calculated, for example, as "the size of a cache block×the number of the cache blocks×the number of the cache ways=128 bytes×1024 blocks×4 ways".

Meanwhile, an address 105 comprises 32 bits specified by the program for the memory access. In the 32 bits of the address 105, the top 15 bits are used as a tag, the next 10 bits are used as an index, and the last 7 bits are used as an offset within a cache block.

According to the above configuration, when a data access (a read out or write in) for the address 105 is specified, one of the block numbers #1 through #n is specified by the 10-bit index in the address 105. Now, the number is assumed as i.

As a result, the cache block 103 (#i) corresponding to the specified block number #i is read out from each of the cache ways 102 (#1) through (#4). The read-out cache blocks 103 (#i) are then input to comparators 104 (#1) through (#4), respectively.

The comparators 104 (#1) through (#4) detect match/mismatch between the tag value in each of the read-out cache blocks 103 (#i) and the tag value in the specified address 105. The cache hit occurs in the cache block 103 (#i) that is read out for the one of the comparator (#1) through (#4) in which the match is detected. As a result, the data read out or write in is performed for the cache block 103 (#i).

When no match is detected in all of the comparators 104, or when the validity flag indicates invalidity even if a match is detected, the cash hit does not occur. In this case, the access is made to the address 105 in the main memory. The feature of the embodiments lies in the replacement method that is applied to the cache memory 101 upon the occurrence of a cache miss.

FIG. 4 is a diagram showing a hardware configuration corresponding to the functional configuration of a cache memory shown in FIG. 3.

The data, tag and sector ID being the components of each cache block 103 in FIG. 3 are stored in three divided areas, i.e., a data RAM 201, a tag RAM 202 and a sector-ID RAM 203. The data RAM 201, the tag RAM 202 and the sector-ID RAM 203 are respectively divided into four areas. The four areas in each RAM constitute cache ways 102 (#1) through (#4), shown in FIG. 3, respectively. While the function of the validity flag can be substitute by the presence/absence of a tag value set in the tag RAM 202, a separate RAM may be disposed for the validity flag.

When a data access for the address 105 is specified, #i from the block numbers #1 through #n in the tag RAM 202 is specified by the 10-bit index in the address 105.

As a result, the tag value of the cache block 103 (#i) corresponding to the specified block number #i is read out from each of the cache ways 102 (#1) through (#4) in the tag RAM 202. The read-out tag values are then input to comparators 104 (#1) through (#4), respectively.

The comparators 104 (#1) through (#4) detect match/mismatch between the tag value in each of the cache blocks 103 (#i) read out from the tag RAM 202 and the tag value in the specified address 105. When a cache hit occurs, the four comparators 104 output a 4-bit hit way signal, in which only the comparator 104 that detects the tag-value match outputs the value 1.

When a cache hit occurs and the memory access request is a read-out request, data values of the four cache blocks 103 (#i) corresponding to the respective cache ways 102 (#1) through (#4) in the data RAM 201 are read out to a selector 204, in accordance with the block number #i specified by the 10-bit index in the address 105. Then, in accordance with the hit way signal output from the four comparators 104, the data value is selected and output, from the cache block 103 (#i) in one of the cache way corresponding to the comparator 104 that detected the tag-value match.

When a cache hit occurs and the memory access request is a write-in request, the data specified by the memory access request is written in one of the block in the cache way specified by the hit way signal, in the four cache blocks (#i) specified by the 10-bit index in the address 105 in the cache ways 102 (#1) through (#4), in the data RAM 201.

The operation of a selector 205 is described later.

First Embodiment

The configuration and operation according to the first embodiment is described below.

While the following description only describes a memory access request based on a user program, the same operation is applied to a memory access request from hardware.

The first embodiment is described assuming a 1-bit sector ID.

FIG. 5 is a block diagram of a replacement way control circuit that determines, upon the occurrence of a cache miss for a memory access request 308 in the cache memory 101 having the configuration shown in FIG. 3 or FIG. 4, data in the cache block 103 corresponding to which one of the four cache ways 102 (#1) through (#4) is to be replaced, the cache ways being in the block number specified by the index.

The occurrence of a cache miss can be detected as a status where no tag-value match is detected in all of the comparators 104 shown in FIG. 3 or FIG. 4, that is, the condition in which the outputs from all of the comparators 104 (#1) through (#4) are inactive. In FIG. 5, a 1-bit sector ID 302 for controlling the data replacement status in the cache memory 101 is attached to the memory access 308 first.

Then, a 4-bit sector ID 301 taken from each of the cache ways 102 (#1) through (#4) (see FIG. 4) in the block number specified by the index in an address 105 in the memory access 308 and the 1-bit sector ID 302 attached to the memory access request 308 are input to the replacement way selection mask generating circuit 303.

The replacement way selection mask generating circuit 303 comprises an exclusive OR circuit (XOR) 303-1 and an inverter (INV) 303-2. The replacement way selection mask generating circuit 303 performs an exclusive NOR operation between the 1-bit sector ID attached to the memory access request 308 and each bit contained in the 4-bit sector ID 301 obtained from the sector-ID RAM 203.

As a result of the operation, a bit value "1" is given, only for the bit positions in the sector ID 301 having the same bit value as the bit value (in the example in FIG. 5, "0") of the sector ID 302 attached to the memory access 308. For example, when "0001" has been read out from the sector-ID RAM 203 in FIG. 4 as the 4-bit sector ID, the bit positions corresponding to "0" are provided with the bit value "1" as a result of the match, and the bit position corresponding to "1" is provided with the bit value "0" as a result of the mismatch. Therefore, "1110" is output as replacement way candidates 309 comprising 4 bits. The replacement way candidates 309 indicate that the cache ways 102 corresponding to the bit positions having the value "1" is the ways for which replacement should be performed, in accordance with the memory access request 308.

Next, a replacement way selection circuit 304 selects one of the ways corresponding to the bit positions having the value "1" in the replacement way candidates 309, in accordance with LRU algorithm and the like. The replacement way selection circuit 304 then outputs a replacement way 310 comprising 4 bits (in the example of FIG. 5, "1000"), in which the value "1" is given only to the bit position corresponding to the selected way.

The replacement way 310 is input to selectors 305, 306 and 307, to make each of the selectors 305, 306 and 307 select a way corresponding to the bit position having the value "1" in the 4-bit data of the replacement way 310.

In other words, the data, tag and sector ID contained in the memory access request 308 are input to the selectors 305, 306 and 307, respectively, and the selectors 305, 306 and 307 outputs them to the way in the data RAM 201, tag RAM 202 and sector-ID RAM 203, respectively, the way corresponding to the bit position having the value "1" in the 4-bit data of the replacement way 310.

Meanwhile, a block number in the data RAM 201, tag RAM 202 and sector-ID RAM 203 is specified by the index in the memory access request 308.

Thus, the data, tag and sector ID are written into the cache blocks 103 in the selected way corresponding to the specified block number (dark blocks in the drawing) in the data RAM 201, tag RAM 202 and sector-ID RAM 203, respectively.

Meanwhile, when the memory access request 308 is a read-out request, the data written into the data RAM 201 is read out from the corresponding address 105 in the main memory (not shown in the drawing). In addition, when the memory access request 308 is a write-in request, the data written into the data RAM 201 is write-in data specified in the memory access request 308.

Thus, according to the first embodiment, upon the occurrence of a cache miss, when the sector ID attached to the memory access request 308 is "0", a cache way corresponding to the sector ID "0" is selected in the sector-ID RAM 203. When the sector ID attached to the memory access request 308 is "1", a cache way corresponding to the sector ID "1" is selected in the sector-ID RAM 203. Then, in the data RAM 201, the data in the cache block 103 in the selected cache way corresponding to the block number specified by the index is replaced by the data corresponding to the memory access request 308.

In accordance with the function described above, when a user conducts a memory access request 308 for data that the user does not wish to remove from the cache memory 101 (that is, the data for which the user requires a high-speed memory access), the user assigns a sector ID "1" (or, the sector ID may be "0") for the memory access 308. Afterwards, when the user performs a memory access request 308 for data that can be removed from the cache memory 101 immediately, the user assigns a sector ID "0" (or, the sector ID may be "1") to the memory access request 308. As a result, for the data for which the memory access 308 has been performed with the assigned sector ID "0", replacement occurs only in the cache way having the sector ID "0" in the cache memory 101 upon the occurrence of a cache miss. The data written into the cache memory 101 with the sector ID "1" assigned in advance is not to be replaced and therefore not to be removed.

As described above, the function of the first embodiment makes it possible to determine and control which data to be removed, in accordance with the sector ID attached to the memory access request 308. The memory access request 308 may be an access instruction specified by a user using a program. Alternatively, the memory access request 308 may be a request automatically issued from certain hardware in the system to the cache memory 101.

Second Embodiment

FIG. 6 is a block diagram of the second embodiment.

In the configuration shown in FIG. 6, the parts having the same number as in the configuration shown in FIG. 5 have the same function as in the first embodiment.

The configuration shown in FIG. 6 differs from the configuration in FIG. 5 in that the sector ID 302 attached to the memory access request 308 is not to be input directly to the replacement way selection mask generating circuit 303. In other words, FIG. 6 differs from FIG. 5 in that the sector ID 302 is judged in a replacement sector ID determination circuit 401 and converted into a replacement sector ID 406, and then input to the replacement way selection mask generating circuit 303.

The following four registers are connected to the replacement sector ID determination circuit 401.

Maximum way number for sector 0 register 402
Maximum way number for sector 1 register 403
Current way number for sector 0 register 404
Current way number for sector 1 register 405

For the maximum way number for sector 0 register 402 and the maximum way number for sector 1 register 403, the maximum number of ways for which the sector ID can be "0", and the maximum number of ways for which the sector ID can be a "1" are set, respectively. These register values can be set by a program.

For the current way number for sector 0 register 404 and the current way number for sector 1 register 405, the number of bits (ways) for which "0" is set in the 4-bit sector ID 301 readout from the sector-ID RAM 203, and the number of bits (ways) for which "1" is set in the 4-bit sector ID 301 are counted and set, respectively, at the time when a block number is specified by the index in the address 105 in the memory access request 308.

As shown in FIG. 7 for example, each of the four registers 402 through 405 comprises 3 bits, having a value ranging from 0 to 4 (maximum way number).

In the replacement sector ID determination circuit 401 in FIG. 6, when the sector ID "0" is given to the memory access request 308, the selector 401-1 selects the output from the maximum way number for sector 0 register 402, and the selector 401-2 selects the output from the current way number for sector 0 register 404. The outputs selected by the selector 401-1 and the selector 401-2 are input to a comparator 401-3. On the other hand, when the sector ID "1" is given to the memory access request 308, the selector 401-1 selects the output from the maximum way number for sector 1 register 403, and the selector 401-2 selects the output from the current way number for sector 1 register 405. The outputs selected by the selector 401-1 and the selector 401-2 are input to the comparator 401-3.

The comparator 401-3 then compares, with respect to the sector ID value specified in the memory access request 308, the maximum way number and the current way number The maximum number of ways here is the information providing an upper limit that defines the number of ways that can be further added for the sector ID.

In the example shown in FIG. 6, the value of the sector ID attached to the memory access request 308 is "1". In this case, the comparator 401-3 compares the maximum number of ways for the sector ID "1" set in the maximum way number for sector 1 register 403, and the current number of ways for the sector ID "1" in the block for the write in, set in the current way number for sector 1 register 405.

When the result of the comparison by the comparator 401-3 shows, with respect to the specified sector ID, "the current number of ways<the maximum number of ways", the number of ways having the specified sector ID can be increased further. Therefore, a selector 401-5 outputs a replacement sector ID 406 for instructing a replacement of a way for which the sector ID is set as the inverse value of the specified sector ID. In other words, the selector 401-5 selects the value corresponding to the sector ID 302 attached to the memory access request 308 inverted by an inverter 401-4. The selector 401-5 then outputs the selected value as the replacement sector ID 406.

Meanwhile, when the result of the comparison by the comparator 401-3 shows, with respect to the specified sector ID, "the current number of ways the maximum number of ways", the number of ways having the specified sector ID cannot be increased further. Therefore, selector 401-5 outputs a replacement sector ID 406 for instructing a replacement of a way for which the specified sector ID is set. In other words, the selector 401-5 selects the sector ID 302 attached to the memory access request 308 and outputs it as the replacement sector ID 406, without any change.

In the example in FIG. 6, when the result of the comparison by the comparator 401-3 for the sector ID "1" shows, with respect to the specified sector ID "1", "the current number of ways<the maximum number of ways", the number of ways having the sector ID "1" can be increased further. Therefore, the selector 401-5 selects the value "0" corresponding to the sector ID "1" attached to the memory access request 308 inverted by an inverter 401-4. The selector 401-5 then outputs the selected value as the replacement sector ID 406.

The replacement sector ID 406 is input to the replacement way selection mask generating circuit 303.

The replacement way selection mask generating circuit 303 and the replacement way selection circuit 304 operate in the same manner as in the first embodiment shown in FIG. 5.

In other words, in FIG. 6, the replacement way selection mask generating circuit 303 performs an exclusive NOR operation between each of the bit values (in the example in FIG. 6, "0001") contained in the 4-bit sector ID 301 read out from the sector-ID RAM 203, and the bit value "0" of the replacement sector ID 406. As a result of the operation, replacement way candidates 309 (in the example in FIG. 6, "1110") comprising 4 bits are output. In the 4-bit replacement way candidates 309, a bit value "1" is given, only for the bit positions having the same bit value as the bit value "0" of the replacement sector ID 406.

Next, the replacement way selection circuit 304 selects one of the ways corresponding to the bit positions having the value "1" in the replacement way candidates 309, in accordance with the LRU algorithm and the like. The replacement way selection circuit 304 then outputs a replacement way 310 comprising 4 bits (in the example of FIG. 6, "1000"), in which the value "1" is given only to the bit position corresponding to the selected way.

The replacement way 310 is input to selectors 305, 306 and 307 that are same as the ones shown in FIG. 5, to make each of the selectors 305, 306 and 307 select a way corresponding to the bit position having the value "1" in the 4-bit data in the replacement way 310.

As a result, in the same manner as in the first embodiment, the data, tag and sector ID are written into the cache blocks 103 (dark blocks in the drawing) corresponding to the block number #i specified by the index in the address in the memory access request 308 in the way selected by selectors 305, 306 and 307, in the data RAM 201, tag RAM 202 and sector-ID RAM 203, respectively, the cache blocks 103.

In FIG. 6, at the same time with the write in, the 4-bit sector ID of the specified block number #i in the sector-ID RAM 203 is updated from "0001" to "1001". In other words, a replacement occurs in a cache block that previously had the sector ID "0", changing the sector ID to "1".

Figure 8:
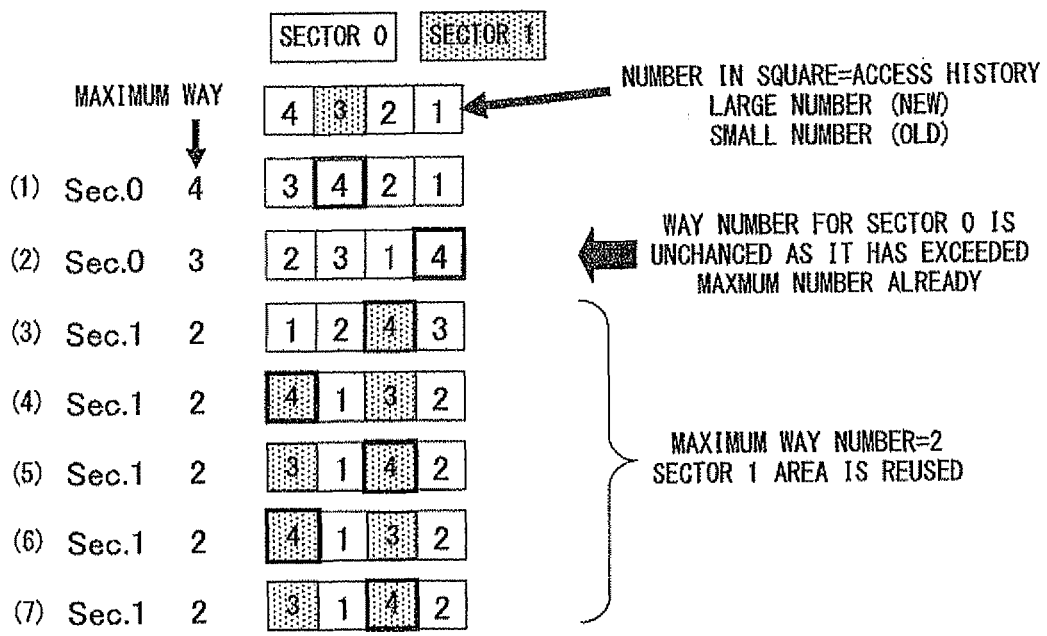
FIG. 8 is a diagram showing an operation example according to the second embodiment.

FIG. 8 is a diagram showing an operation example assuming a case, in accordance with the configuration shown in FIG. 6, when the memory access request 308 occurs seven times ((1) thorough (7) shown in FIG. 8), and a cache miss and replacement occur with all of the requests.

The four squares in FIG. 8 represent the respective ways (#1) through (#4) in a given block number in the data RAM 201 in the cache memory 101. The square is white when its sector ID is "0", and is gray when its sector ID is "1". The number in the square represents the access history. A larger number indicates a newer (recently accessed) way.

For each memory access request 308 (1) through (7) in FIG. 8, "Sec.0" indicates that the value of the sector ID attached to the memory access request is "0", and "Sec.1" indicates that the value of the sector ID attached to the memory access request is "1". The number next to "Sec.0" and "Sec.1" indicates the maximum number of ways (MAXIMUM WAY) at the time of the occurrence of each memory access request 308.

The current number of ways and the maximum number of ways are compared every time the memory access request 308 occurs, to select a replacement way.

For example, when the first memory access request 308 (1) occurs, the sector ID is specified as "0" and the maximum way number is specified as "4" by the request. Looking at the status immediately before the occurrence of the request (the status shown in the top row in FIG. 8), the current number of ways for the sector ID "0" is 3, which is smaller than the maximum way number "4" specified by the request. Therefore, the replacement sector ID determination circuit outputs a replacement sector ID "1" for giving an instruction to replace the sector ID "1" in the ways shown in gray to the sector ID "0". As a result, in accordance with the exclusive NOR operation performed between the replacement sector ID and the current sector ID "0100", replacement way candidates "0100" are output from the replacement way selection mask generating circuit. The replacement way is determined as "0100" accordingly, and a replacement occurs in the way having the sector ID value "1".

When the second memory access request 308 (2) occurs, the sector ID is specified as "0" and the maximum way number is specified as "3" by the request. Looking at the status in (1) immediately before (2), the current number of ways for the sector ID "0" is "4", which is larger than the maximum way number specified by the request. Therefore, the replacement sector ID determination circuit outputs a replacement sector ID "0" for giving an instruction to replace the sector ID "0". As a result, in accordance with the exclusive NOR operation performed between the replacement sector ID and the sector ID "0000" in (1), replacement way candidates "1111" are output from the replacement way selection mask generating circuit. Next, as a result of an LRU judgment in the replacement way selection circuit, a replacement way "0001" for giving an instruction to replace the oldest of the four ways having the sector ID "0" is output from the replacement way selection circuit, and a replacement occurs in the way having the value "1".

When the third memory access request 308 (3) occurs, the sector ID is specified as "1" and the maximum way number is specified as "2" by the request. Looking at the status in (2) immediately before (3), the current number of ways for the sector ID "1" is 0, which is smaller than the maximum way number specified by the request. Therefore, the replacement sector ID determination circuit outputs a replacement sector ID "0" for giving an instruction to replace the ways having the other sector ID "0". As a result, in accordance with the exclusive NOR operation performed with the current sector ID "0000" (in (2)), replacement way candidates "1111" are output from the replacement way selection mask generating circuit. Next, as a result of an LRU judgment in the replacement way selection circuit, a replacement way "0010" for giving an instruction to replace the oldest of the four ways having the sector ID "0" is output from the replacement way selection circuit, and a replacement occurs in the way having the value "1".

When the fourth memory access request 308 (4) occurs, the sector ID is specified as "1" and the maximum way number is specified as "2" by the request. Looking at the status in (3) immediately before (4), the current number of ways for the sector ID "1" is "1", which is smaller than the maximum way number specified by the request. Therefore, the replacement sector ID determination circuit outputs a replacement sector ID "0" for giving an instruction to replace the ways having the other sector ID "0". As a result, in accordance with the exclusive NOR operation performed with the current sector ID "0010" (in (3)), replacement way candidates "1101" are output from the replacement way selection mask generating circuit. Next, as a result of an LRU judgment in the replacement way selection circuit, a replacement way "1000" for giving an instruction to replace the oldest of the three ways having the sector ID "0" is output from the replacement way selection circuit, and a replacement occurs in the way having the value "1".

When the fifth memory access request 308 (5) occurs, the sector ID is specified as "1" and the maximum way number is specified as "2" by the request. Looking at the status in (4) immediately before (5), the current number of ways for the sector ID "1" is "2", which is equal to (or larger than) the maximum way number specified by the request. Therefore, the replacement sector ID determination circuit outputs a replacement sector ID "1" for giving an instruction to reuse and replace the ways having the same sector ID "1. As a result, in accordance with the exclusive NOR operation performed with the current sector ID "1010" (in (4)), replacement way candidates "1010" are output from the replacement way selection mask generating circuit. Next, as a result of an LRU judgment in the replacement way selection circuit, a replacement way "0010" for giving an instruction to replace the older of the two ways having the sector ID "1" is output from the replacement way selection circuit, and a replacement occurs in the way having the value "1".

In the same manner, when the sixth and seventh memory access requests 308 (6) and (7) occurs, the sector ID is specified as "1" and the maximum way number is specified as "2" by the request. The current number of ways for the sector ID "1" is "2" in the status immediately before, the number being equal to or larger than the maximum way number. Therefore, the ways having the same sector number "1" is reused and replaced.

Thus, the second embodiment enables the control of the replacement operation applied to the cache memory 101 in accordance with the maximum way number that can be set by the user for each sector ID.

Third Embodiment

Next, the configuration and operation of the third embodiment based on the configurations shown in FIG. 3 and FIG. 4 are described.

FIG. 9 is a block diagram related to a hit way control circuit with the occurrence of a cache hit for the memory access request 308 in the cache memory 101 having the configuration shown in FIG. 3 or FIG. 4, A hit way update circuit 701 in FIG. 9 is disposed in, for example, the selector 205 shown in FIG. 4. A 4-bit hit way signal 702 output from the four comparators 104 is input to the hit way update circuit 701. In the hit way signal 702, the value "1" is given, only the bit value corresponding to the one of the cache ways 102 (#1) through (#4) (see FIG. 3 or FIG. 4) in which a cache hit has been occurred.

The hit way update circuit 701 updates, in current sector ID information 703 read out from the block in the sector-ID RAM 203 corresponding to the block number specified by the index in the address 105 contained in the memory access request 308, the sector ID value corresponding to the cache way for which the value "1" is given as the bit value in the hit way signal 702, to the value of a sector ID 704 attached to the memory access request 308. The hit way update circuit 701 then writes a new sector ID 705 obtained by the operation back in the position corresponding to the block number in the sector-ID RAM 203.

Thus, the sector ID value of the cache block 103 in which a cache hit has occurred is controlled so that it is always the same with the sector ID value specified by the memory access request 308, thereby avoiding the occurrence of process inconsistency.

Figure 10:
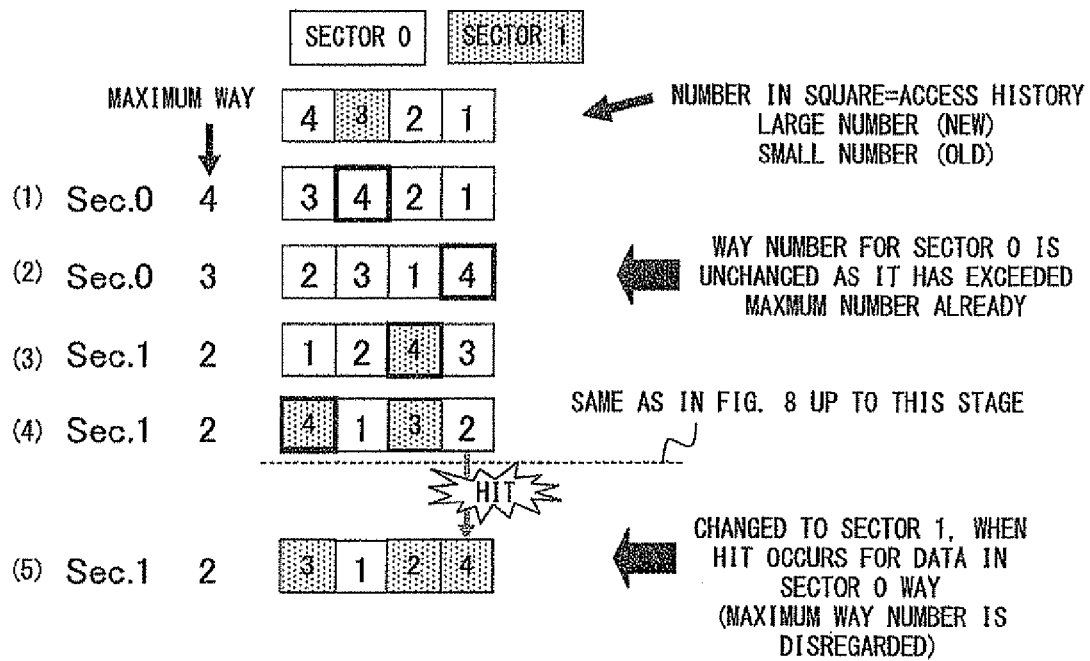
FIG. 10 is a diagram showing an operation example according to the third embodiment.

FIG. 10 is a diagram showing an operation example assuming a case, in accordance with the configuration shown in FIG. 9, in which the memory access request 308 occurs five times ((1) through (5) shown in FIG. 10), and a cache miss and replacement occur for the memory access requests 308 (1) through (4), and a cache hit occurs for the last memory access request 308 (5).

The operations performed for the memory access requests 308 (1) through (4) in FIG. 10 is the same as the ones performed for the memory access requests 308 (1) through (4) in FIG. 8.

When the fifth memory access request 308 (5) occurs in FIG. 10, the sector ID is specified as "1" and the maximum way number is specified as "2" by the request. Looking at the status in (4) immediately before (5), the current number of ways for the sector ID "1" is "2". Now, it is assumed that a cache hit has been occurred in the right most cache way having the sector ID "0" in (4). IN this case, the sector ID value "0" of the cache way in which the cache hit has been occurred is updated to the sector ID "1" specified by the memory access request 308, without the reference and control for the maximum way number described with the second embodiment.

Fourth Embodiment

Next, the fourth embodiment is described.

The configuration of the fourth embodiment is basically the same as the configuration of the second embodiment shown in FIG. 6. However, the condition "the maximum number of ways for sector 0+the maximum number of ways for sector ID 1>the total number of ways in the cache memory" is allowed in this embodiment, so that the area for the sector ID "0" and the area for the sector ID "1" can be overlapped, making it possible to separately provide, in an area provided for a sector ID, a way that is easily removed in accordance with a request having the other sector ID, and a way that is not easily removed or that is not removed.

Specifically, the maximum way number in the maximum way number for sector 0 register 402 and maximum way number for sector 1 register 403 in FIG. 6 can be set with a value that allows the above condition.

Figure 11:
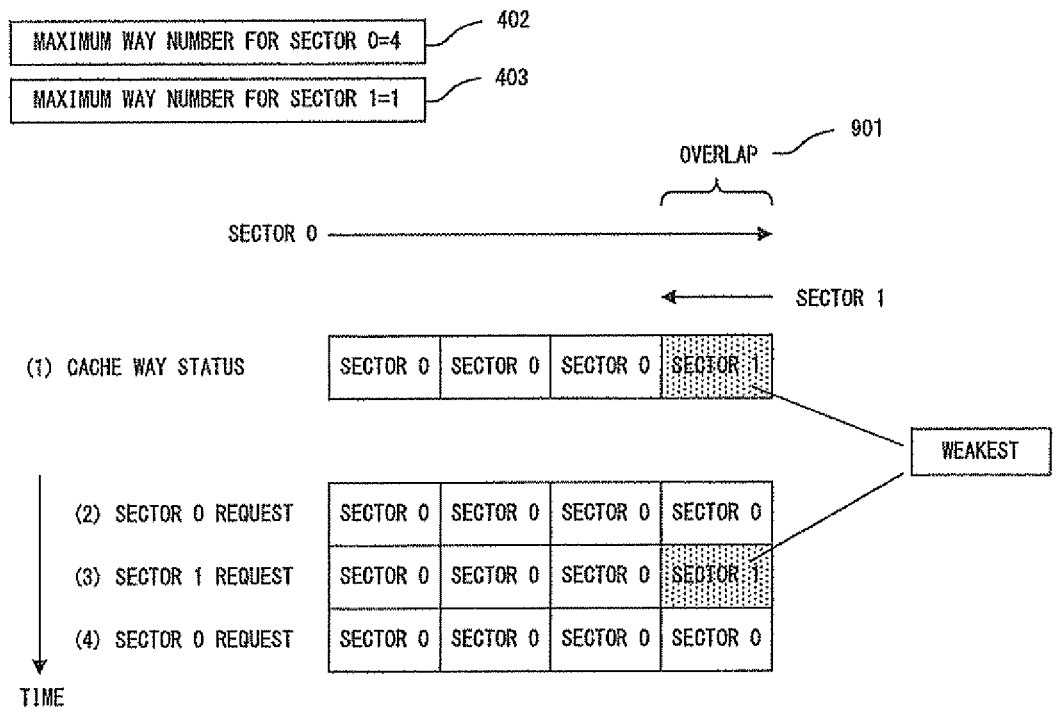
FIG. 11 is a diagram illustrating operations according to the fourth embodiment.

The operation in the fourth embodiment is described referring to FIG. 11.

FIG. 11 illustrates an operation example for realizing the weakest way method in accordance with the fourth embodiment.

The weakest way method is a method for performing a control in which, when a replacement of a cache block is required, an intended cache block is always removed first.

In FIG. 11, the value "4" is set for the maximum way number in the maximum way number for sector 0 register 402, and "1" is set for the maximum way number for sector 1 register 403. Since the maximum number of ways in the cache memory 101 having the configuration shown in FIG. 3 or FIG. 4 is "4", one of the ways is overlapped and shared, as in the cache way status shown at 901 in FIG. 11

The user sets, for example, the sector ID "1", for a memory access request 308 with respect to a way in which the data is always removed first (the way is referred to as the "weakest way"). A small value is set, as the maximum value for the maximum way number register for the sector ID value. A large value that allows the overlap mentioned above is set, as the maximum value for the maximum way number register for the other sector ID value.

In the example shown in FIG. 11, the sector ID "1" is the sector ID of the weakest way.

In the status at (1) in FIG. 11, of the four ways for a given block number, the cache blocks in three ways store the data "sector ID=0" (shown as "SECTOR 0" in the drawing), and the cache block in one way stores the data "sector ID=1" (shown as "SECTOR 1" in the drawing).

In this status, a memory access request 308 with an attached sector ID "0" occurs for the block number, as shown at (2) in FIG. 11. In this case, the number of ways ("3") for the sector ID "0" in the block number has not reached the maximum number "4". Therefore, in accordance with the operation of the replacement sector ID determination circuit 401 in FIG. 6 described with the second embodiment, the cache block in the way storing the sector ID "1" is replaced (removed), resulting in all of the ways having the sector ID "0".

Next, as shown at (3) in FIG. 11, a memory access request 308 with an attached sector ID "1" occurs for the block number. In this case, the number of ways ("0") for the sector ID "0" in the block number has not reached the maximum number "1". Therefore, in the same manner as the operation described above, one of the cache blocks in the four ways storing the sector ID "0" is replaced (removed), resulting in only one way having the sector ID "1".

While it is not shown in the drawing, if a memory access request 308 with an attached sector ID "1" occurs afterwards, the cache block in the one way storing the sector ID "1" is continuously replaced with one another, and the number of way storing the sector ID "1" does not exceed one. Meanwhile, if a memory access request 308 with an attached sector ID "0" occurs, the cache block storing the sector ID "1" is immediately replaced and removed, in accordance with the memory access request 308 with the sector ID "0".

Thus, the fourth embodiment makes it possible to realize a similar function to the weakest way method.

Fifth Embodiment

FIG. 12 is a block diagram of the fifth embodiment related to a further improved mode of the replacement way control circuit shown in the second embodiment.

In the configuration shown in FIG. 12, the parts having the same number as in the configuration shown in FIG. 5 or FIG. 6 have the same function as in the first or second embodiment.

The configuration shown in FIG. 12 differs from the configuration shown in FIG. 6 in that a selector 1002 is added with respect to the replacement sector ID determination circuit 401. The selector 1002 selects and outputs, as a replacement sector ID 1003, either of an output 406 from the replacement sector ID determination circuit 401 or a fixed value 1001, in accordance with the value of the sector ID 302 attached to the memory access request 308.

The additional configuration realizes the following function. When, for example, the value "0" is set for the fixed value 1001 and the sector ID "1" is specified, the replacement sector ID determination circuit 401 determines whether the cache way having the sector ID "0" is to be replaced or the cache way having the sector ID "1" is to be replaced, in accordance with the maximum way number. The selector 1002 outputs the result as the replacement sector ID 406. On the other hand, when the sector ID "0" is specified, the selector 1002 always selects the sector ID "0" (the same value as the specified sector ID).

The user can create the following control condition, for example. The operation in accordance with the second embodiment may be performed first, without setting the fixed value 1001. Then, at a certain timing afterwards, the value "0" may be set for the fixed value 1001 by a program, making it possible to increase cache blocks storing the sector ID "1", by replacing the data in cache blocks storing the sector ID "0", with reference to the maximum way number. However, cache blocks having the sector ID "0" are not to be increased by replacing the data in cache blocks storing the sector ID "1".

Thus, the area for the sector ID "1" can be increased as needed, in accordance with a memory access request 308 with an attached sector ID "1". By contrast, with respect to the area for the sector ID "0", a setting can be made so that, once the area is replaced by the area for the sector ID "1" it cannot be increased even by a memory access request 308 with an attached sector ID "0".

Sixth Embodiment

Next, the sixth embodiment is described.

FIG. 13 is a diagrams showing an example of configuration corresponding to the replacement sector ID determination circuit 401 shown in FIG. 6 in accordance with the configuration of the cache memory 101 shown in FIG. 3 or FIG. 4A in a case where the sector ID comprises 2 bits instead of 1 bit, and has either of the three values 0 through 2.

In the sixth embodiment, the following six registers are connected.

Maximum way number for sector 0 register 1101
Maximum way number for sector 1 register 1102
Maximum way number for sector 2 register 1103
Current way number for sector 0 register 1104
Current way number for sector 1 register 1105
Current way number for sector 2 register 1106

For the maximum way number for sector 0 register 1101, the maximum way number for sector 1 register 1102, and the maximum way number for sector 2 register 1103, the maximum number of ways for which the sector ID can be "0", "1" and "2" is set, respectively. These register values can be set by a program.

For the current way number for sector 0 register 1104, the current way number for sector 1 register 1105, and the current way number for sector 2 register 1106, the number of bits (ways) for which "0" is set in the 4-bit sector ID 301 read out from the sector-ID RAM 203, the number of bits (ways) for which "1" is set in the 4-bit sector ID 301, and the number of bits (ways) for which "2" is set in the 4-bit sector ID 301 are counted and set, respectively, at the time when a block number is specified by the index in the address 105 in the memory access request 308.

As shown in FIG. 14 for example, each of the six registers 1101 through 1106 comprises 3 bits, having a value ranging from 0 to 4 (maximum way number).

In FIG. 13, when the sector ID "0" is given to the memory access request 308, the selector 1108 selects the output from the maximum way number for sector 0 register 1101, and the selector 1109 selects the output from the current way number for sector 0 register 1104. The outputs selected by the selector 1108 and the selector 1109 are input to a comparator 1110. Meanwhile, when the sector ID "1" is given to the memory access request 308, the selector 1108 selects the output from the maximum way number for sector 1 register 1102, and the selector 1109 selects the output from the current way number for sector 1 register 1105. The outputs selected by the selector 1108 and the selector 1109 are input to the comparator 1110. In addition, when the sector ID "2" is given to the memory access request 308, the selector 1108 selects the output from the maximum way number for sector 2 register 1103, and the selector 1109 selects the output from the current way number for sector 2 register 1106. The outputs selected by the selector 1108 and the selector 1109 are input to the comparator 1110.

The comparator 1110 then compares, with respect to the sector ID value specified in the memory access request 308, the maximum number of ways and the current number of ways. When the current number of ways is smaller than the maximum number of ways, the comparator 1110 outputs a same/other selection signal 1111 (having the value "0" for example) instructing that the same sector ID as the sector ID 1107 attached to the memory access request is to be selected. When the current number of ways is equal to or lager than the maximum number of ways, the comparator 1110 outputs the same/other selection signal 1111 (having the value rim for example) instructing that a sector ID other than the sector ID 1107 attached to the memory access request is to be selected.

Figure 15:
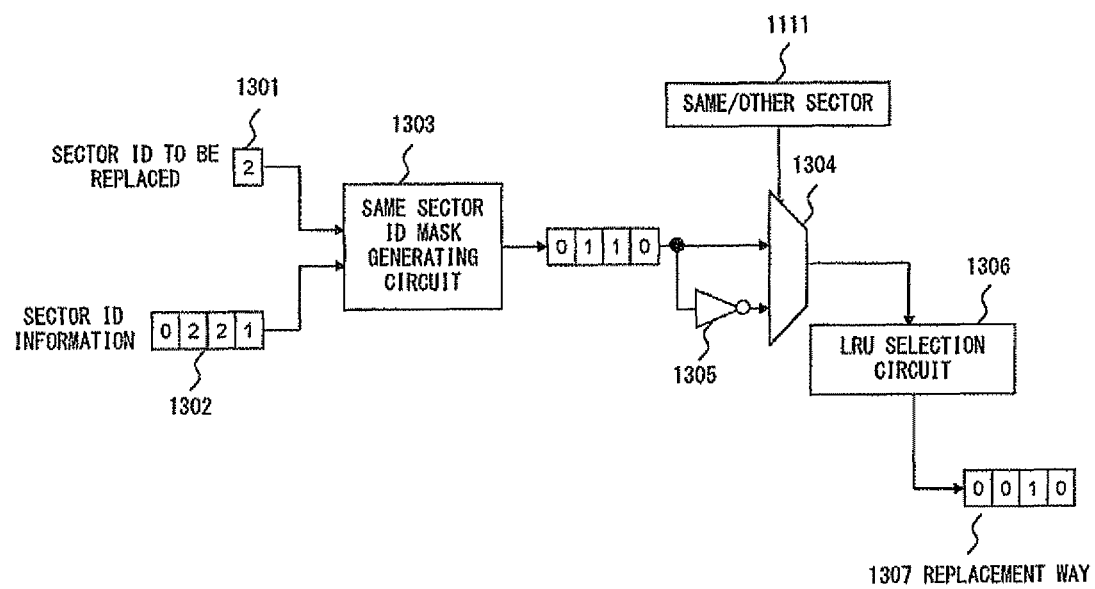
FIG. 15 is a block diagram (part 2) of the sixth embodiment.

FIG. 15 is a diagram showing an example of configuration according to the sixth embodiment, corresponding to the replacement way selection mask generating circuit 303 and the replacement way selection circuit 304 in FIG. 5 or FIG. 6.

A same sector ID mask generating circuit 1303 compares each sector ID value of a sector ID 1301 attached to the memory access request and sector ID information 1302 read out from a corresponding block number in the sector-ID RAM 203, to generate a mask bit sequence (4 bits) in which "1" indicates a match and "0" indicates a mismatch.

A selector 1304 selects outputs, when the same/other selection signal 1111 output from the comparator 1110 shown in FIG. 13 instructs that the same sector ID is to be selected (for example, with the signal having the value "0"), the 4-bit mask bit sequence output from the same sector ID mask generating circuit 1303 without any change. Meanwhile, when the same/other selection signal 1111 output from the comparator 1110 shown in FIG. 13 instructs that another sector ID is to be selected (for example, the signal having the value "1"), the selector 1304 outputs a 4-bit mask bit sequence obtained by inverting each value of the 4-bit mask bit sequence output from the same sector ID mask generating circuit 1303.

An LRU selection circuit 1306 selects and outputs, as a replacement way 1307, one of the bits having the value "1" in the input 4-bit sequence, in accordance with the LRU algorithm. The replacement way 1307 is a signal corresponding to the replacement way 310 in FIG. 6 and specifies the cache way to be the object of replacement, in the corresponding block number in the cache memory 101.

The sixth embodiment described above enables the user to perform the control of the replacement in the cache memory 101 with more stages, using a program.

For the first through sixth embodiments described above, it is assumed that the memory access request is issued by a user program. However, the entirely same function can be realized, for a memory access request issued automatically by hardware to a cache memory, in a system adopting a write-back cache or a system having a plurality of cache memories corresponding to a plurality of processors.

The above embodiments utilizes the addition of sector ID information corresponding to each cache way in a cache block specified by a memory access, and a simple judgment process, which makes it possible to realize similar functions to the local memory (high-speed memory area) function and the weakest way method, with only a small amount of cost for hardware. The embodiments thus enable the program optimization and improvements in the program execution speed.

Regarding the hardware cost for the above embodiments, the embodiments only require the addition of the registers (about 3 bits) for storing the maximum way numbers, comparison/mask circuits, and a sector-ID RAM for storing the sector ID information corresponding to each cache block, which does not involve any change to the operating system. Therefore, only a small amount of cost is required for the hardware and software modification.

Meanwhile, in the embodiments, the processes that may affect the performance are only the processes such as the comparison the current way number and the maximum way number, and mask process for the ways in accordance with the result of comparison. Therefore, there is little negative impact on the performance from circuit complication.

In addition, in the embodiments, either one of a way having the same sector ID or a way having another sector ID is always selected as the object of replacement, in accordance with the comparison of the maximum way number and the current way number. Therefore, there never occurs a condition in which, as in the lock system, all of the ways are locked leaving no way to be the object of replacement, thereby avoiding the system shutdown.

In addition, in the embodiments, the maximum number of ways can be individually set with respect to the value of each sector ID information. Furthermore, cache ways assigned to each sector ID information can be overlapped by allowing the condition that the total number of the respective maximum way numbers for each sector ID information may exceed the maximum number of cache ways currently provided in the cache memory, making it possible to realize a similar function to the weakest cache way method.

What is claimed is:

1. A cache memory including a plurality of cache blocks in each of a plurality of cache ways, the cache memory comprising:
   a sector ID memory that stores a plurality of sector IDs of the plurality of cache blocks each corresponding to each of the plurality of cache ways, the sector ID being used for replacing each of the plurality of cache ways;
   a plurality of way number registers that are each provided for each of the sector IDs, and each hold a maximum way number specifying a maximum number of the cache ways assignable to each of the sector IDs;
   a comparison unit that compares a number of cache ways having one of the plurality of the sector IDs corresponding to a sector ID attached in a memory access request and the held maximum way number corresponding to the sector ID attached in the memory access request;
   a selector that selects a replacing sector ID based on a comparison result of the comparison unit;
   a determination unit that determines one or more replacement way candidates to be replaced from the plurality of cache ways based on the selected replacing sector ID and a plurality of sector IDs stored in the sector ID memory corresponding to a request address included in the memory access request when a cache miss occurs in the cache memory;
   a selection unit that selects a replacement way from the determined one or more replacement way candidates; and
   an update unit that updates the stored sector ID based on each of the cache ways in the cache block specified by the memory access request, according to the sector ID attached to the memory access request.

2. The cache memory according to claim 1, wherein the maximum way number for each of the sector ID is assignable in a manner in which a total number of the respective maximum way numbers for each of the sector ID exceeds a number of the cache ways provided in the cache memory.

3. The cache memory according to claim 1, wherein the determination unit determines only one replacement way candidate to be replaced by specifying a predetermined value as the sector ID included in the memory access request and by setting a maximum way number to a way number register corresponding to the sector ID specified as the predetermined value, the set maximum way number being smaller than maximum way numbers held in other way number registers, when a cache miss occurs in the cache memory.

4. The cache memory according to claim 1, wherein the update unit replaces the stored sector ID with the sector ID included in the memory access request when a cache hit occurs in the cache memory.

5. A controlling method for a cache memory including a plurality of cache blocks in each of a plurality of cache ways, and a plurality of way number registers that are each provided for each of a plurality of sector IDs, the plurality of way number registers each hold a maximum way number specifying a maximum number of the cache ways assignable to each of the sector IDs, the controlling method comprising:
   storing a plurality of sector IDs of the plurality of cache blocks in a sector ID memory, the plurality of sector IDs each corresponding to each of the plurality of cache ways, the sector ID being used for replacing each of the plurality of cache ways, comparing a number of cache ways having one of the plurality of the sector IDs corresponding to a sector ID attached in a memory access request and the held maximum way number corresponding to the sector ID attached in the memory access request;

selecting a replacing sector ID based on a comparison result of the comparing;

determining one or more replacement way candidates to be replaced from the plurality of cache ways based on the selected replacing sector ID and a plurality of sector IDs stored in the sector ID memory corresponding to a request address included in the memory access request when a cache miss occurs in the cache memory;

selecting a replacement way from the determined one or more replacement way candidates; and updating the stored sector ID based on each of the cache ways in the cache block specified by the memory access request, according to the sector ID attached to the memory access request.

* * * * *